3,335,438
FLOATING LIGHT
Isaburo Takeyasu, 52 Obayashi Nogamidori, 1-chome, Takarazuka, Japan, and Shoshichiro Nagai, % Osaka Municipal University, 12 Nishi-ogimachi, Kita-ku, Osaka, Japan
Filed May 12, 1965, Ser. No. 455,088
Claims priority, application Japan, May 16, 1964, 39/27,588
1 Claim. (Cl. 9—8.3)

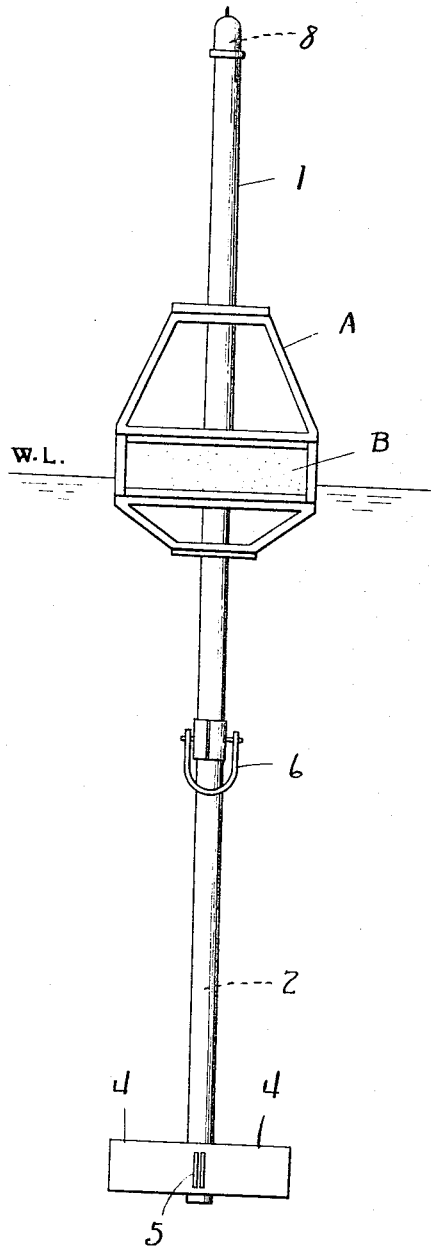
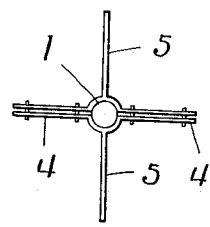
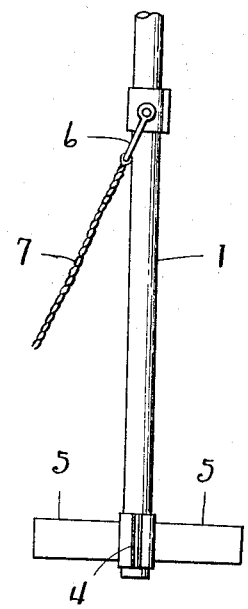

This invention mainly relates to a simple floating light used for the sign of dredging of harbours and rivers, job site of reclamation, or steamship route. Specially this is devised for the rapid currents. Conventionally the large size floating lights such as the spin type or the boat type have been used. They are all considerably inclined against the strong current and wave, and then could not obtain a satisfactory stability. Further, their construction cost was high and considerably uneconomical.

Hence, this invention eliminates the above disadvantages, and is intended to reduce a great deal of construction cost.

This is so devised that it functionally would be compared favourably with the conventional floating lights.

One practical form of our improved floating light is illustrated by way of example in the accompanying drawings in which:

FIGURE 1 is a front view of the floating light.

FIGURE 2 is a partial cross section except the floating body.

FIGURE 3 is a partial side view.

In the drawings 1 is the hollow cylinder made of aluminium or plastics.

Battery groups 2 are placed in the lower space of the cylinder 1. The automatic flashing light 9, connected with the battery 2, is provided on the top of cylinder 1.

On the half-way of cylinder 1, the rotating ellipsoid floating body B is fixed to the frame A to minimize the current resistance. The floating body B in filled with foamed plastics to maintain the floating capacity even if partially damaged.

Blades 4, 5, two blades forming one set, are provided in crosswise on the bottom section of cylinder 1.

One set of blades 5, 5 is intended to position the float to the flow direction of the current and the said blades are longer than blades 4, 4. Blades 4 are so provided that produce the moment around the hanger 6 to counteract the moment applied on the top section by utilizing the dynamic force of the current acted on the blades 4, 4, in order to protect the float top from inclining to downstream direction of the current by the moment of around the hanger 6 due to dynamic current pressure applied on the float top.

Hanger 6 is provided on the cylinder located at the midway between the said float B and blades 4, 5, and located at the side of the direction blades.

The hanger 6 is connected with the weight (not shown in the drawing) through the rope 7. W.L. of FIGURE 1 indicate the water level. For the type having the weight on the bottom of the main body made of a long cylinder, such as the conventional simple float light, the light body was inclined towards the downstream of the current because the dynamic water pressure of the current is applied on the float body, and also the light body was sunk into water due to small buoyancy and it could not expect the satisfactory operation. It has been known that the resistance blades were provided on the bottom section.

However, they were extremely unstable because the wing length are same and the desired direction can not be obtained. Accordingly, although they show somewhat effective to stop the sway caused by wind and waves from the upper reaches of the lighting body, they are entirely unsatisfactory regarding the centering property of the inclination against the rapid current from the lower reaches.

On the contrary, by invention, the float body is mounted on the center position of the cylinder body, and buoyancy is increased. The height of the metacenter is enlarged, and the direction blades 5 and the current resistance blades 4, which have respectively different sizes, are provided.

The weight and the linking ropes are connected at the side of the direction blades of center cylinder.

The light body is so positioned that it is stationed at the fixed direction by the direction blades 5 and rope 7.

The centering property of the float is increased by the moment around the hanger by the dynamic water pressure of the current acting on the blades 4.

The light body maintains effectively stable vertical condition constantly.

We claim:

A floating light comprising an elongated hollow body adapted to hold a power source for a light, a light on the upper end of said body, a float body mounted on said body intermediate the ends thereof and closer to the top than to the bottom end, a pair of stabilizing blades on the bottom end of said body, said blades being substantially flat and perpendicular to each other, one of the blades being longer than the other, and an anchor line securing means for securing only a single length of anchor line to said light, said securing means being positioned about midway between said float body and said blades and being adapted to hold the anchor line to the light so that it leads away from the body substantially in the direction in which said longer blade extends, whereby said blades not only hold the body in a substantially erect position by exerting a moment about said securing means counter to the moment exerted by said float body, but also align the body with the longer blade in the direction of the current.

References Cited

UNITED STATES PATENTS

| 1,231,199 | 7/1917 | Del Fungo-Giera | 9—8 |
| 2,856,616 | 10/1958 | Dodge | 9—8.3 |
| 3,167,793 | 2/1965 | Keats | 9—8 |

MILTON BUCHLER, *Primary Examiner.*

T. MAJOR, *Assistant Examiner.*